3 Sheets. Sheet 1.
C. Wheeler. Jr.
Mower.
No. 1967 Reissued. May. 23. 1865.
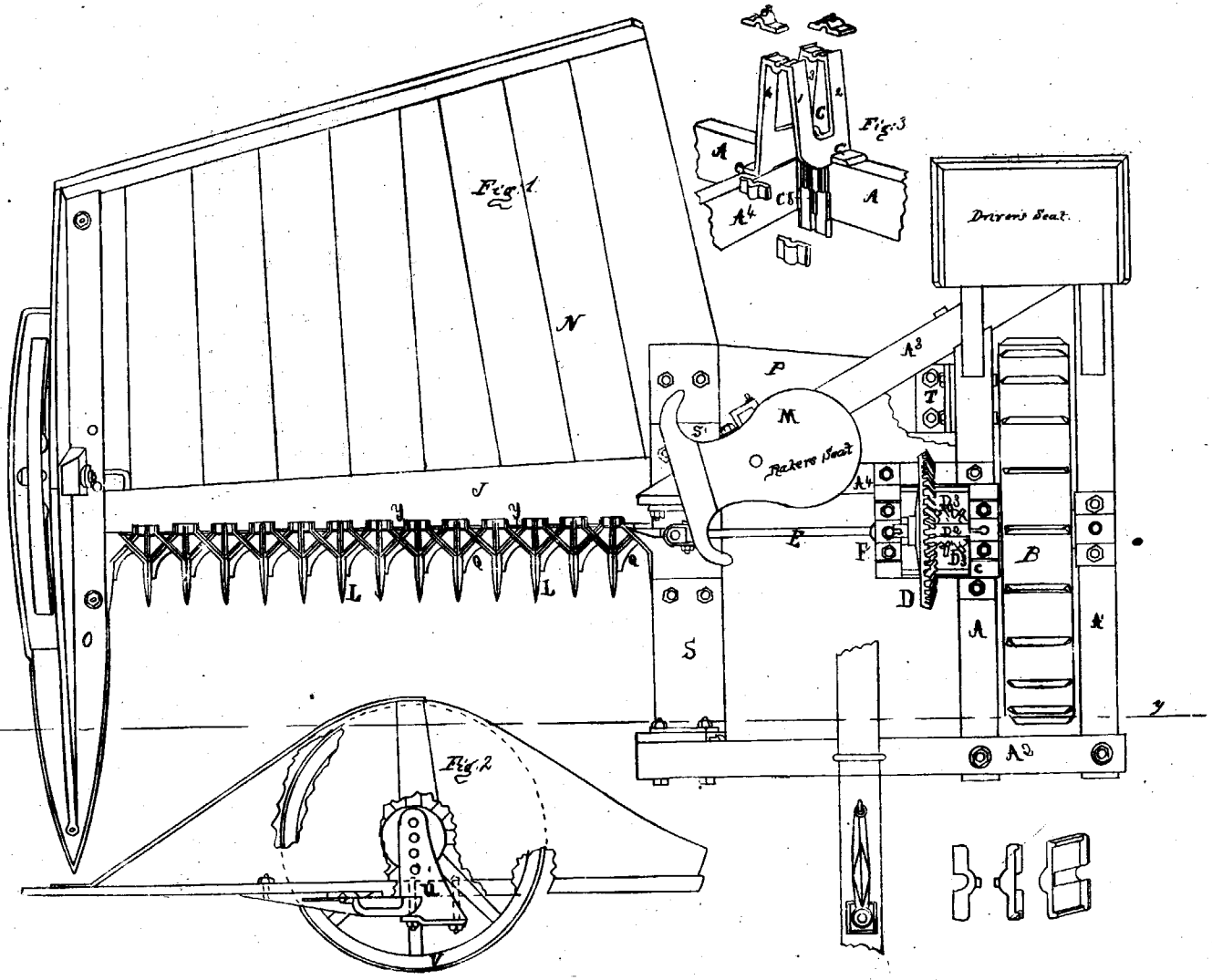
Witnesses James H. Gridley
Allen T. Houghton
C. Wheeler Jr. By
P. B. Fontaine Atty

C. Wheeler, Jr.
Mower.
No. 1967. Reissued May. 23. 1865.
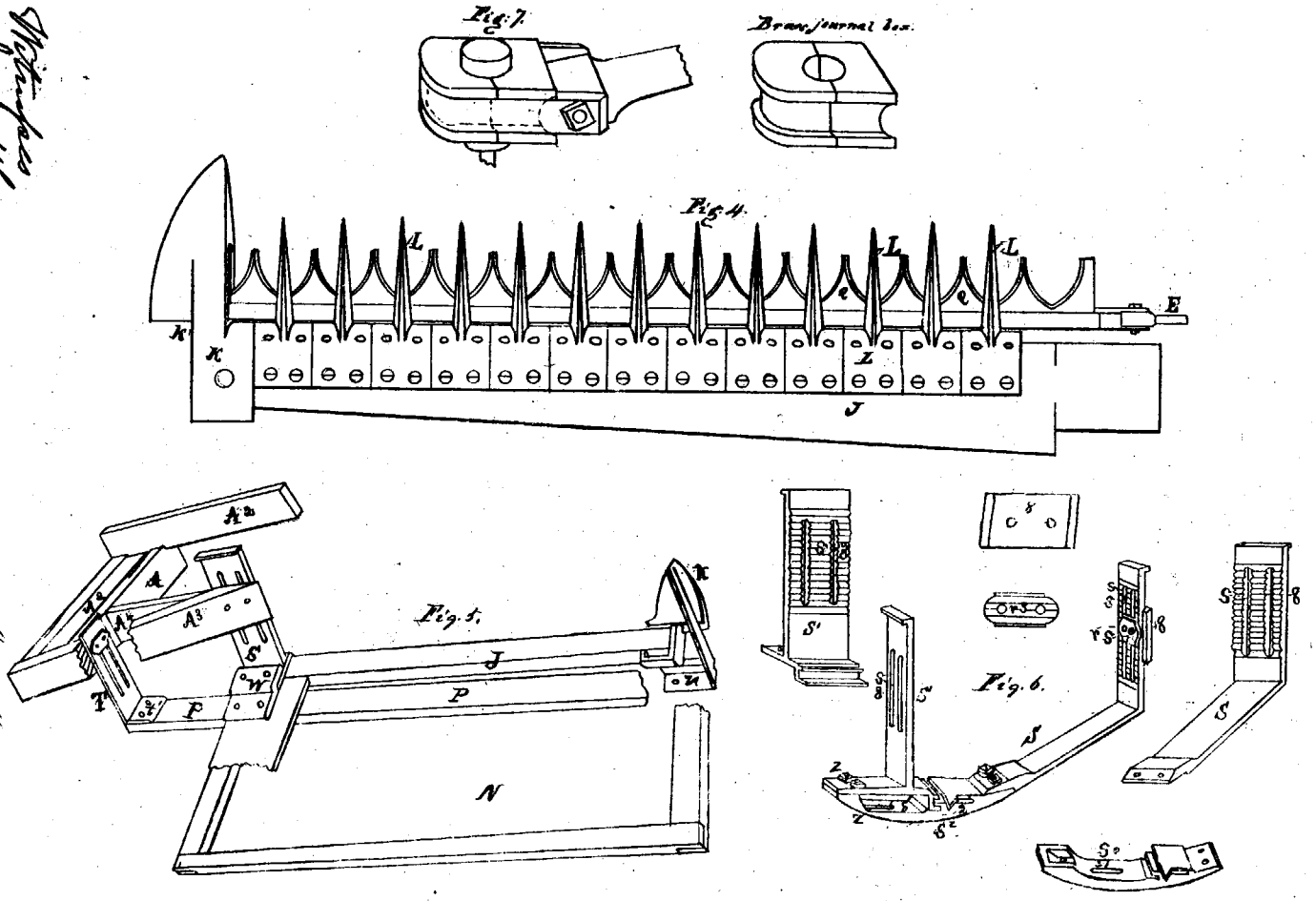
Witnesses
James H. Gyrdley
Allen J. Jungston
C. Wheeler Jr
By E. B. Forbush
Atty 3 Sheets. Sheet 3.
C. Wheeler Jr.
Mower.
No. 1967. Reissued May 23. 1865.
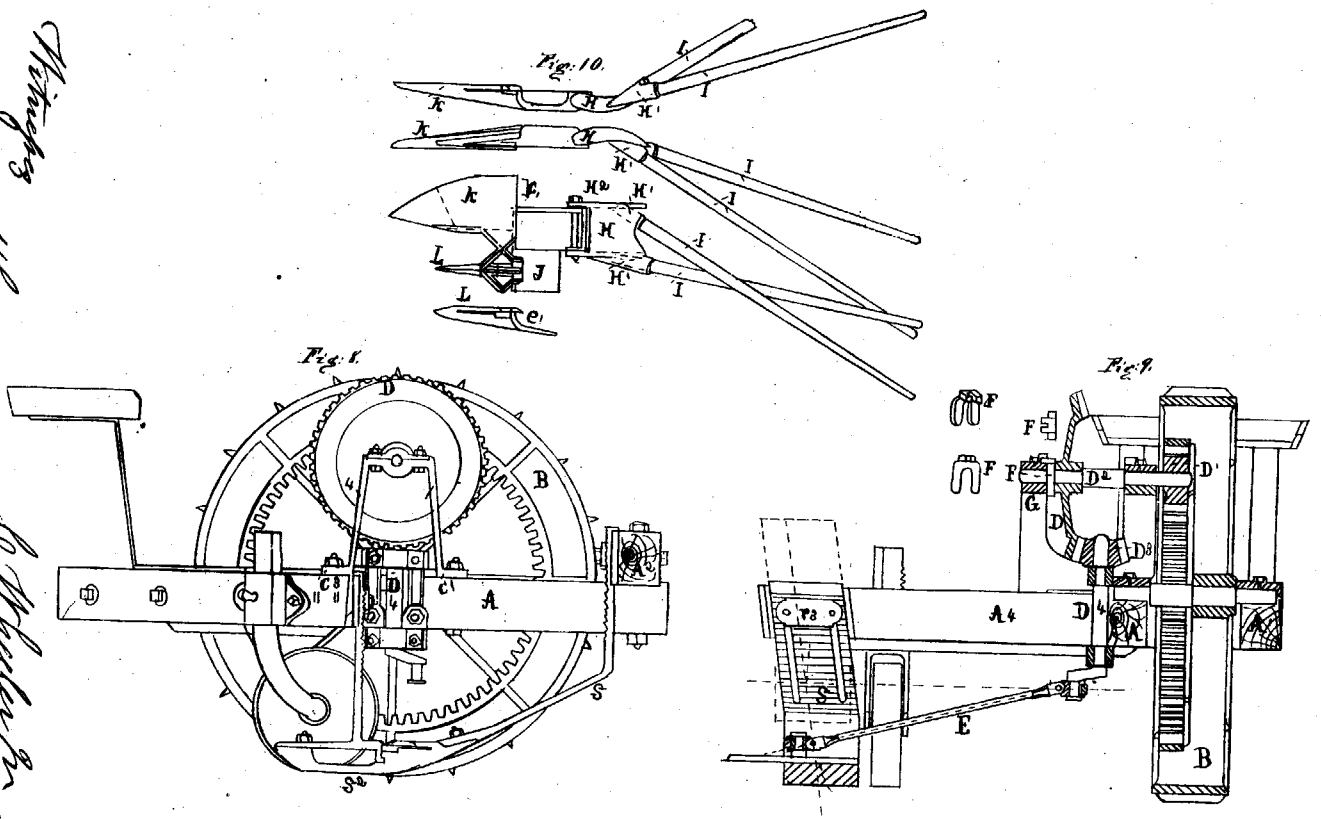
Witnesses
James H. Gridley
Allen F. Jonghton
C. Wheeler Jr
By E. P. Forbush
Atty

UNITED STATES PATENT OFFICE.

CYRENUS WHEELER, JR., OF POPLAR RIDGE, NEW YORK, ASSIGNEE, BY MESNE ASSIGNMENTS, OF E. B. FORBUSH.

IMPROVEMENT IN HARVESTERS.

Specification forming part of Letters Patent No. 12,721, dated April 17, 1855; Reissue No. 707, dated April 26, 1859; Reissue No. 1,967, dated May 23, 1865.

DIVISION A.

*To all whom it may concern:*

Be it known that ELIAKIM B. FORBUSH, of the city of Buffalo, in the county of Erie and State of New York, heretofore invented certain new and useful Improvements in Grain and Grass Harvesting Machines, for which Letters Patent of the United States were issued to him on the 17th day of April, 1855, which said Letters Patent were afterward canceled and new Letters Patent issued to him on the 26th day of April, 1859, and such last-mentioned Letters Patent are deemed to be invalid and inoperative by reason of a defective and insufficient specification. Now, therefore, I, CYRENUS WHEELER, Jr., of Poplar Ridge, in the county of Cayuga and State of New York, assignee, by mesne assignments, of, in, and to the whole interest, right, and title of the said patents and said inventions and improvements, do hereby declare, pursuant to the statute in such case made and provided, that the following is a full and exact description of distinct and integral parts of said invention and improvements, reference being had to the accompanying drawings, making a part of this specification, in which—

Figure 1 is a top or plan view of said grain and grass harvesting machine. Fig. 2 is an outer end elevation of the grain-platform. Fig. 3 is a perspective view of a cast-iron frame for supporting the small gear-wheels in a compact working position. Fig. 4 is a bottom plan of the finger-bar and cutting apparatus. Fig. 5 is a detached perspective to show the strengthening-bar of the grain-platform and the manner of connecting it to the main frame of the machine. Fig. 6 is a perspective of the device, called a "clamp," for holding the finger-bar and cutting apparatus, and for connecting the same to the main frame of the machine, each part thereof being also shown separately. Fig. 7 is an end view of the connecting-rod and brass journal-box separate therefrom. Fig. 8 is a side elevation of the machine, the grain-platform, finger-bar, and cutting apparatus being removed. Fig. 9 is a section of the driving-wheel, gear-frame, and gearing and connecting-rod, and a portion of the main frame and clamp, with detached views of the gear-key. Fig. 10 represents different views of the track-clearer, outer shoe, and guard-finger.

The nature of the said invention and improvements, so far as the same are embraced in the part or division thereof herein described and claimed, consists, first, in so constructing the main frame that the rear cross-timber thereof shall project inwardly at an angle toward the center-line of the machine; second, in constructing a cast-iron gear-frame for holding the gear-wheels in compact working position; third, in constructing and using a gear-key for holding the gear-wheels in or out of gear.

Letters of like name and kind refer to like parts in each of the figures.

The main frame of the machine consists of five timbers—to wit, the two parallel timbers A and A′, between which the driving-wheel B is placed, (the axle of the driving-wheel being supported in appropriate journals on these timbers,) and the front cross-timber, $A^2$, the rear cross-timber, $A^3$, and the brace-timber $A^4$. These timbers are nicely framed and bolted together and form a strong compact frame. The principal improvement in the construction of this frame consists in placing the rear cross-timber, $A^3$, at an oblique angle and projecting it inwardly toward the center-line of the machine, sufficient to meet the line of the axle of the driving-wheel at about two feet nine inches (more or less) from the driving-wheel. By this construction and arrangement the frame is conveniently adapted to receive and hold the clamp or other suitable device (by which the finger-bar and cutters are held and raised and lowered) at a sufficient distance from the driving-wheel to connect the cutters to the crank-shaft by a connecting-rod of suitable length for an easy working of the cutters. It also places the cross-timber $A^3$ in a position to brace (lengthwise) against the lateral or twisting strain of the finger-bar when the machine is at work, and also makes room to rake off the grain at the side of the platform and in rear of the frame, and at the same time admit of the use of a comparatively narrow and light platform, and the finger-bar and cutters maintained at a central position relatively to the driving-wheel. The construction of the frame also permits the use of a short finger-bar—*i. e.*, a finger-bar of the length, or nearly so, of the cutter-bar—and also furnishes an advantageous position for the raker's seat.

The pillow-block or gear-frame C, Fig. 3, is made of cast-iron, and is for the purpose of supporting the small gear-wheels in compact working position, so that the gear-wheels may be fitted and placed in this frame, and the gear-frame then placed in proper position on the main frame of the machine. It has four upright pillars, 1 2 3 4, rising sufficiently high to bring the spur-pinion into gear with the cog-rim of the driving-wheel.

The multiplying bevel-wheel is represented at D, the spur-pinion at D′, and the shaft upon which they are supported at $D^2$, and the bevel-pinion at $D^3$, and the crank and bevel-pinion shaft at $D^4$, and the connecting-rod at E in Fig. 9. This frame has three feet or bearings, by which it is supported upon the main frame of the machine by means of suitable bolts passing through. Two of these feet are shown at C′ $C^2$, Fig. 3, and one at $C^3$, Fig. 8. An arm-piece, $C^5$, projects downwardly, and is bolted to the timber A of the main frame for the support of the crank-shaft. The shaft $D^2$, which carries the bevel-wheel D and spur-pinion D′, is constructed with appropriate shoulders and bearings, so that it may be moved longitudinally in a manner to engage and disengage the bevel-wheel D with the bevel-pinion $D^3$, or, in other words, so that these wheels may be placed in or out of gear, as may be desired; and in order to hold these wheels in or out of gear with each other a gear-key is provided, which is shown in different views at F in Fig. 9. This key is made forked, so as to set astride the shaft $D^2$ and fill the space between the hub of the bevel-wheel D and its journal-box G to hold the wheels in gear, as shown in Fig. 9. There is a notch or slot in the top part of the key, which engages with a corresponding nib on the journal-cap to hold it in place. When it is desired to place these wheels out of gear the gear-key is removed from its place and the shaft moved longitudinally in the direction to disengage the bevel-wheels, and then the gear-key is placed upon the other side of the wheel D, and between a shoulder formed on the shaft $D^2$ and the journal-box on that side of the wheel, so as to hold the wheel D out of gear. This furnishes a convenient and efficient mode of gearing and ungearing these wheels, and of holding them in or out of gear, as may be desired.

Having now described those parts of the said invention embraced in this division sufficiently to enable a mechanic skilled in the art to make and use the same, it is deemed unnecessary to include the description of other parts, which will be made the subject of separate applications.

What I claim as the invention of the said FORBUSH, and desire to secure by these Letters Patent, is—

1. In a harvesting-machine, where the cutting apparatus is placed opposite or nearly opposite the center of the driving-wheel, so constructing the main frame that the rear cross-timber shall project inwardly at an angle toward the center-line of the machine, substantially as represented by the cross-timber $A^3$.

2. A gear-frame, C, having suitable bearings formed therewith for supporting the crank and bevel-wheel shafts, with the gearing mounted thereon, in a compact working position, substantially as described.

3. A gear-key, F, in combination with the gearing-shaft $D^2$, constructed and used substantially as described.

In testimony whereof I hereunto subscribe my name in the presence of two witnesses.

C. WHEELER, JR.

Witnesses:
W. H. MEAKER,
WM. ALLEN.